INVENTOR.
MERLE V. HOOVER
BY
ATTORNEY

April 9, 1963 M. V. HOOVER 3,085,239
RADIO-FREQUENCY SWITCHING
Filed March 18, 1957 2 Sheets-Sheet 2

INVENTOR.
MERLE V. HOOVER
BY
ATTORNEY

United States Patent Office 3,085,239
Patented Apr. 9, 1963

3,085,239
RADIO-FREQUENCY SWITCHING
Merle V. Hoover, Lancaster, Pa., assignor to Radio Corporation of America, a corporation of Delaware
Filed Mar. 18, 1957, Ser. No. 646,850
18 Claims. (Cl. 343—5)

The present invention relates to improved radio-frequency switches and circuits, of the general type used, for example, in radar systems.

Conventional transmit-receive (TR) switches have a number of serious disadvantages which may seriously impair radar system operation. For example:

(1) Switch operation, in most cases, depends solely upon the radio-frequency energy from the radar transmitter. This energy causes sudden ionization of the gas in the switch tube. However, during the brief interval required fully to ionize the gas, a portion of the radio-frequency energy, known as "spike leakage," passes through the switch to the radar receiver. The spike leakage adversely affects both the life of the receiver input stage (usually a delicate crystal) and the receiver operation.

(2) Keep-alive circuits, which are employed with certain types of switches to lessen the effects of spike leakage, are sometimes cantankerous, noisy and sources of other operational difficulties.

(3) If the switch fails to conduct for some reason, the receiver can be seriously damaged—even by a single transmitter pulse. Unfortunately, one cannot determine whether the switch will conduct until after the transmitter pulse is initiated, and it is then too late to prevent damage to the receiver.

(4) The life of the usual transmit-receive switch is relatively short. The arc between the switch electrodes causes the ends of the electrodes to become deformed, and eventually to fail. Moreover, if the electrodes are in a cavity resonator, the deformed electrodes may adversely affect the tuning of the resonator.

(5) A received pulse cannot pass through the switch to the receiver until the gas in the transmit receive switch is deionized. However, it is difficult quickly to deionize the switch and the deionization time may vary from pulse to pulse due to numerous operational variables. Thus, the minimum range at which the radar system can detect a target may vary from pulse to pulse.

(6) As one goes up in power, the conventional transmit-receive switch becomes less and less satisfactory. The greater the transmitted power, the greater the heat developed at the switch and the shorter the switch life.

An object of this invention is to provide radio-frequency switches of improved design which are capable of long life and which can handle extremely large amounts of power.

Another object of the invention is to provide an improved type of transmit-receive switch in which the amount of power which leaks through the switch is substantially lessened.

Another object of the invention is to provide a transmit-receive switch circuit which includes means for preventing the transmitter from generating a radio-frequency pulse if the switch for any reason becomes inoperative.

Still another object of the invention is to provide an improved transmit-receive switch circuit in which the deionization time of the switch is minimized.

A preferred form of this invention includes a radio-frequency switch of the type including an ionizable gas, a pre-firing electrode to which a pulse may be applied for partially ionizing the gas and thereby placing the switch in condition to conduct, and a firing electrode to which a radio-frequency pulse may be applied for causing the switch to conduct. In the preferred form of the invention, the switch is a vapor electric device having a mercury cathode and an ignitor electrode in contact with the mercury serving as the pre-firing electrode. Details of new and improved switch configurations, according to this invention, are given below.

In operation, a pre-firing pulse is applied to the pre-firing electrode and this partially ionizes the gas in the switch tube. The pulse applied to the transmitter is generated only in response to the partial ionization of the gas. This, in effect, is a built-in safety or interlock circuit since the transmitter is not triggered if the switch is defective, and if the transmitter is not triggered, the receiver is not damaged. If the switch is operative, the transmitter is triggered, the transmitted pulse is applied to the firing electrode, and the switch conducts. Upon termination of the transmitter pulse, a deionization pulse may be applied to the firing electrode for opening the switch. The deionization pulse may be generated in response to the partial ionization of the gas in the switch.

The invention will be described in greater detail by reference to the following description taken in connection with the accompanying drawing in which.

Figure 2:
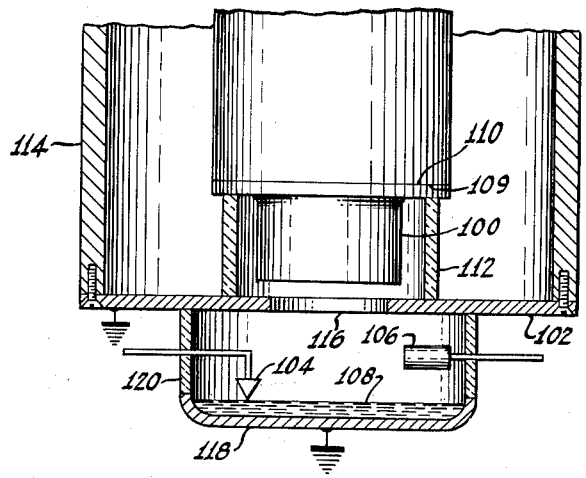
FIGURE 2 is a cross section of an ignitron tube according to this invention.
Figure 3:
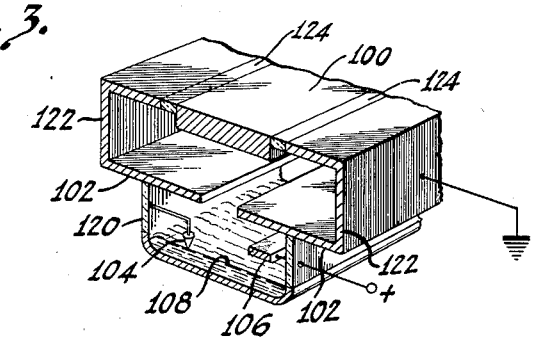
FIGURE 3 is a view, partially in cross section, and partially in perspective of another type of ignitron tube according to this invention.

Similar reference characters are applied to similar elements in FIGURES 2 and 3 of the drawing.

Figure 1:
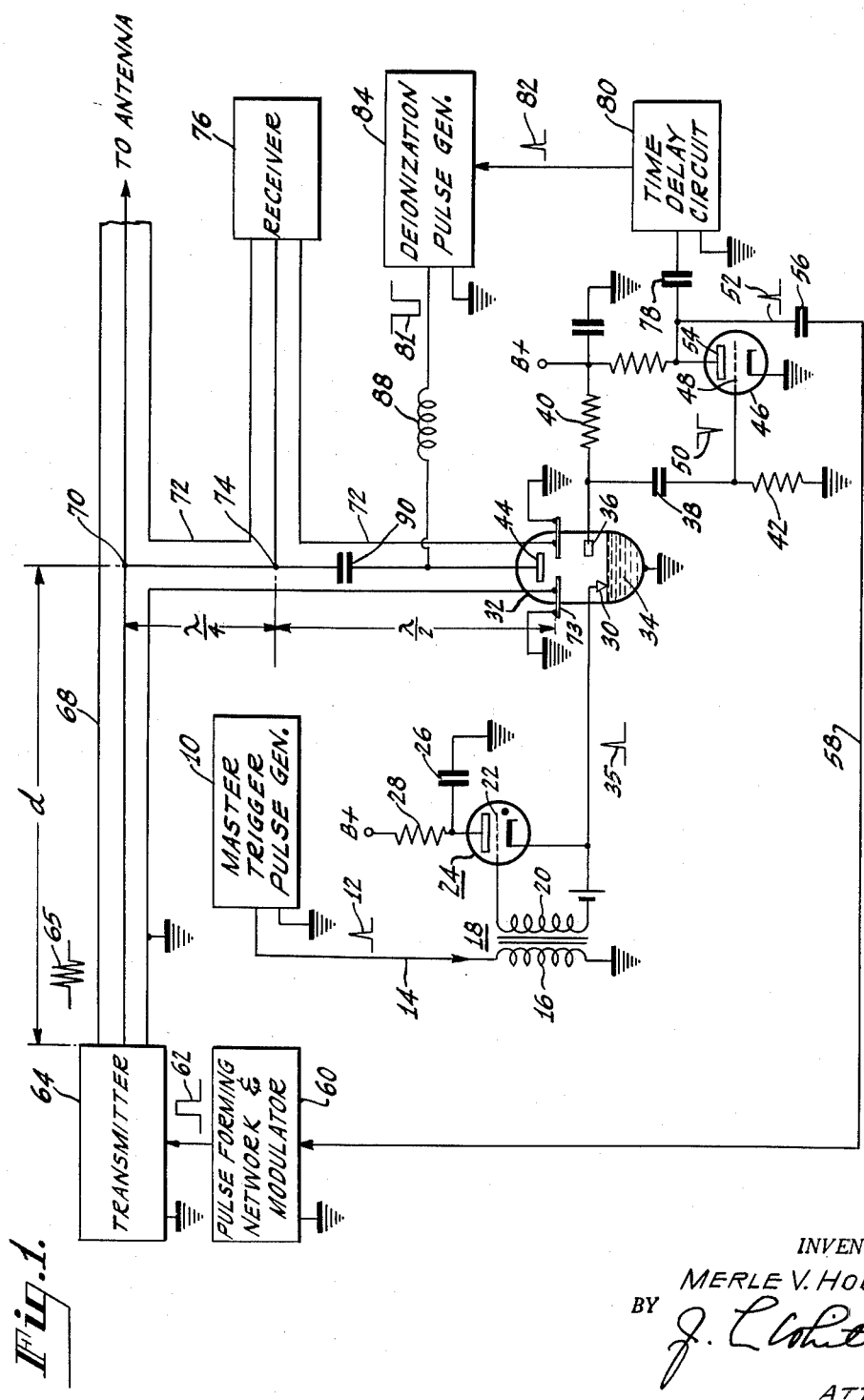
FIGURE 1 is a block and schematic circuit diagram of one form of the present invention.

Referring to FIGURE 1, master trigger pulse generator 10 may consist of a blocking oscillator, or a sine wave oscillator and means for converting the sine wave into spaced pulses, or other known similar pulse-generating circuit. The pulses 12 are applied via lead 14 to the primary winding 16 of pulse transformer 18. The secondary winding 20 of the transformer is connected to the control grid 22 of a normally cut-off thyratron 24. Condenser 26, which is connected through resistor 28 to B+, is at the B+ potential. When a pulse 12 is applied through transformer 18 to control grid 22, the thyratron fires and condenser 26 discharges through its anode-to-cathode circuit. The latter circuit is connected in series with the ignitor electrode 30 of the ignitron 32. As can be seen in the figure, the end of the ignitor electrode extends into the grounded pool of mercury 34, and when a pulse 35 from thyratron 24 passes to the ignitor electrode, it creates an arc discharge.

Auxiliary anode 36 is located fairly close to the surface of mercury pool 34. This auxiliary anode is connected to condenser 38. The latter is maintained charged to the B+ potential through the charging circuit including resistor 40, condenser 38 and resistor 42. However, when the pulse applied to the ignitor electrode causes the mercury vapor immediately above the pool to become ionized, condenser 38 discharges through the circuit including resistor 42, condenser 38, auxiliary anode 36 and mercury pool 34. This discharge maintains the gas in the ignitron partially ionized until the transmitter pulse is applied to the anode or firing electrode 44, as will be explained below.

Triode 46 normally conducts since its control grid 48 is normally at ground potential. However, when the condenser 38 discharges through the ignitron, control grid 48 is driven highly negative, as indicated by pulse 50. This causes a positive pulse 52 to be generated at the anode 54. The positive pulse is applied through coupling condenser 56 and lead 58 to the pulse forming network and modulator, shown as a single block 60. The latter applies a shaped pulse 62 to transmitter 64 and causes the latter to transmit a high-power, radio-frequency pulse 65.

Summarizing the operation of the transmit-receive circuit as described so far, pulse 12 from trigger generator 10 causes the thyratron 24 to fire. The thyratron applies a pulse 35 to the ignitor electrode 30 of the ignitron, and this "spikes" the ignitron. Condenser 38 then discharges through the auxiliary anode 36 and mercury pool, and this maintains the mercury vapor in the ignitron partially ionized. Triode 46 responds to the discharge of condenser 38 through the ignitron and applies a pulse to the pulse forming network and modulator, and the latter, in turn, triggers the transmitter.

The transmitter output pulse 65 is applied to coaxial line 68 and thence to the antenna (not shown). A portion of the transmitted energy also passes from the T junction 70 to the firing electrode 44 of the ignitron. The gas in the ignitron is already partially ionized and the application of the high-power pulse to electrode 44 causes the ignitron to become completely ionized. (The radio-frequency discharge path is from anode 44 to radio-frequency cathode 73.) The ignitron therefore appears as a short circuit across the end of coaxial line branch 72. The short circuit is three quarters of a wave length, at the operating frequency, from junction 70 and therefore appears at junction 70 as an open circuit. For this reason, appreciable energy at junction 70 cannot pass into coaxial line branch 72. The spacing $d$ between the transmitter and junction 70 is such that received pulses pass to the receiver and not to the transmitter. Finally, the spacing of junction 74 from the ignitron is such that the received pulses see an open circuit when looking from junction 74 toward the ignitron, when the ignitron does not conduct.

In a modified form of the invention, a gaseous arc is established in the space between anode 44 and cathode 73 immediately after a pulse is applied to auxiliary anode 36 and before the transmitter is triggered. This is accomplished by amplifying the output pulse of triode 46 (or using that pulse to trigger a high power pulse generator), and applying the resultant pulse through a radio-frequency choke to anode 44. An advantage of this form of the invention is that the "pilot" arc established between electrodes 44 and 73 places the ignitron in an even more complete ready state, in anticipation of the transmitter pulse. In this form of the invention, the transmitter triggering pulse may be obtained from the pilot arc pulse circuit described above, or from the anode 44.

It should be mentioned that the transmission line configuration shown is given merely by way of example and is not meant to be limiting. Other alternative arrangements may be used instead. For example, the configurations shown in chapter XI of the volume "Principles of Radar" by the MIT Radar School Staff, may be used. Moreover, waveguides or two-wire transmission lines may be used instead of the coaxial lines shown, depending upon the particular operational requirements.

Referring still to FIGURE 1, the output pulse of triode 46 (lower right), in addition to being applied to the pulse forming network and modulator 60, is also applied through coupling condenser 78 to a time delay circuit 80. The latter, for example, may comprise a delay line and should be adjusted to provide a delay such that the deionization pulse 81 does not occur prior to the termination of the transmitter pulse. The delayed pulse 82 is applied to a deionization pulse generator 84. The latter may comprise a blocking oscillator, singly stable multivibrator, phantastron, or similar circuit. Its output pulse 81, which is negative-going, is applied through radio-frequency choke 88 to the anode 44 of the ignitron. The function of the deionization pulse is quickly to deionize the gas in the ignitron and thereby quickly to place the receiver 76 in condition to receive return pulses (echoes). The function of condenser 90 is to prevent short circuiting of the deionization pulse generator by the center conductor of the transmission line system.

A mercury cathode type tube suitable for use in the circuit of FIGURE 1 is shown in place on the end of coaxial line in FIGURE 2. The tube includes an anode 100, a radio-frequency cathode 102, an ignitor electrode 104, an auxiliary anode electrode 106 and a pool of mercury 108. The anode 100 corresponds to anode 44 of FIGURE 1, cathode 102 to cathode 73 of FIGURE 1, etc. Preferably, the end 109 of anode 100 is flat and butts against the end 110 of the center conductor of the coaxial line. (Other configurations are possible. For example, the anode may be partially hollow and may engage a correspondingly shaped coaxial line inner conductor end.) The anode is insulated from the radio-frequency cathode 102 by cylindrical wall 112 which may be formed of a ceramic. Cathode 102 makes electrical contact with the outer conductor 114 of the coaxial line. If desired, the circumferential edge of the cathode 102 may be formed with threads to engage corresponding threads machined on the inner surface at the end of the outer conductor 114 of the coaxial line. Other mechanical types of connections are possible. In the arrangement shown, screws 115 pass through holes in the cathode and into tap holes in the end of outer conductor 114. The cathode 102 is formed with a center circular aperture 116. Preferably, the portions of the cathode and anode of the tube which are exposed to mercury are made of tungsten or with tungsten inserts in order to minimize erosion sputtering resulting from mercury arc activity.

The mercury pool 108 is contained in a metal "bath tub" 118. The mercury and its metal container are insulated from the radio-frequency cathode 102 by cylindrical wall 120 which may be formed of glass or the like. Although not shown in the drawing, means may be provided for controlling the temperature in the mercury pool and for cooling the anode. These may take the form of coils embedded in the anode through which a cooling liquid flows and similar coils embedded in or adjacent to the metal wall of the mercury pool container. Alternatively, air cooling may be employed.

The ignitor electrode 104 may be similar to those used in conventional ignitron tubes and includes a tip formed of a refractory metal. Tubes of this type are described, for example, in the volume of Fundamentals of Vacuum Tubes by Eastman, beginning at page 107. The auxiliary anode 106 is preferably fabricated from carbon or a type of metal or alloy which is not attacked by mercury. The mercury cathode is shown as a pool of liquid mercury, however, sponge-type mercury cathodes may be used instead (both in the embodiments of FIGURES 2 and 3). Such cathodes are shown, for example, in U.S. Patent Nos. 2,617,070, 2,617,065 and 2,617,064.

In operation, there may be a certain amount of RF "fringing field" about the aperture 116, but it does not penetrate into the "bath tub" area to any great extent. The volume below aperture 116 may be viewed as a cathodic region in which a "roaring arc" is initiated (when the pre-firing pulse is applied to the ignitor electrode) to provide the electrons and positive ions needed for the establishment of a gaseous breakdown between the radio frequency elements, anode 100 and cathode 116.

A switch tube suitable for use with a waveguide network is shown in FIGURE 3. Elements in the tube shown in FIGURE 3 which are analogous to those shown in FIGURE 2 are identified by the same reference numerals and need no further explanation. A tube of the type shown is closed at both ends by a wave transparent window (not shown) and is connected into a ridged waveguide. The anode 100 is merely a continuation of the ridged structure of the remainder of the waveguide. It is insulated from the remainder of the waveguide by ceramic strips 124. Walls 122 are continuations of the narrow walls of the rectangular ridged waveguide. Radio-frequency cathode 102 is a continuation of the broad wall of the waveguide opposite the broad wall formed with the ridge.

The embodiment of FIGURE 3 contains an anode which is a continuation of a ridged structure of a ridged waveguide. However, it should be appreciated that the anode need not be ridged. The waveguide portion of the ignitron may be formed merely as a continuation of a conventional section of rectangular waveguide with the wall opposite the cathode wall containing strips of insulating material analogous to strips 124 for insulating the anode from the remainder of the waveguide.

What is claimed is:

1. In combination, a radio-frequency transmission line; and a radio-frequency switch for short circuiting said radio-frequency transmission line in response to the application thereto of radio-frequency energy of greater than a predetermined power level comprising a mercury cathode type electron discharge tube connected across said line.

2. In combination, a radio-frequency transmission line; a mercury pool type electron discharge tube connected across said line for short circuiting said line when it conducts; means including a tube electrode for partially ionizing the gas within said tube; and means including a second tube electrode responsive to the transmission along said line of radio-frequency energy of greater than a predetermined power level for substantially entirely ionizing the gas in said tube and thereby short circuiting said line.

3. In combination, a radio-frequency transmission line; a radio-frequency switch for short circuiting said transmission line in response to the application thereto of radio-frequency energy of greater than a predetermined power level comprising a mercury pool type electron discharge tube; and circuit means including a tube electrode for partially ionizing the gas in said tube prior to the application thereto of said radio-frequency energy.

4. In combination with a radio-frequency switch tube of the type including an ionizable gas, a pre-firing electrode to which a pulse may be applied for partially ionizing said gas and thereby placing said switch in condition to conduct, and a firing electrode to which a radio-frequency pulse may be applied for causing said switch to conduct; circuit means connected to said pre-firing electrode for applying a pre-firing pulse thereto; and means connected to said switch tube and responsive to the partial ionization of said gas for applying a radio-frequency pulse to said firing electrode.

5. In combination with a radio-frequency switch tube of the type including an ionizable vapor, a pre-firing electrode for placing said switch in condition to conduct in response to the application thereto of a pre-firing pulse, and a firing electrode to which a firing pulse may be applied for causing said switch to conduct; circuit means connected to said pre-firing electrode for applying a pre-firing pulse thereto and thereby placing said switch in condition to conduct; and means connected to said switch for sensing when it is in condition to conduct for applying a firing pulse to said firing electrode solely when said switch is in condition to conduct.

6. In combination with a radio-frequency switch tube of the type including an ionizable gas, and a firing electrode to which a radio-frequency pulse may be applied for ionizing said gas; circuit means connected to said firing electrode for applying thereto, upon the termination of said radio-frequency pulse, a pulse for deionizing said gas.

7. The combination of a tube containing an ionizable gas and having an anode electrode and a cathode electrode between which a voltage pulse may be applied for ionizing said gas; and circuit means connected to said anode electrode and responsive to at least partial ionization of said gas for applying a delayed voltage pulse between said anode and cathode electrode which is more negative at said anode than at said cathode for deionizing said gas.

8. The combination of a tube containing an ionizable gas and having a cathode electrode, an ignitor electrode adjacent to said cathode electrode for striking an arc in said gas and thereby ionizing said gas in the vicinity of said cathode electrode, and an anode electrode to which a voltage pulse may be applied after said arc has been struck for ionizing the gas between said anode and cathode electrodes; and circuit means connected to said anode electrode and responsive to partial ionization of said gas for applying a delayed voltage pulse between said anode and cathode electrodes which is more negative at said anode electrode than at said cathode electrode for deionizing said gas.

9. In combination, a tube containing an ionizable gas and having an anode electrode, and a cathode electrode between which a voltage pulse may be applied for ionizing said gas; means connected to said tube and responsive to partial ionization of the gas therein for producing a pulse; delay circuit means connected to receive and to delay said pulse; and other circuit means connected to said delay circuit means for applying a delayed pulse between said anode and cathode electrodes in a sense to deionize said gas.

10. A radar system comprising a pulse transmitter; a receiver; a single antenna for both radiating and receiving pulse signals; a duplexer circuit interconnecting said transmitter, receiver and antenna for substantially preventing the transmitter pulses from reaching the receiver; and means for causing said transmitter to transmit only in response to the placing of said duplexer circuit into operative condition whereby any transmitter pulses produced are substantially prevented from reaching the receiver.

11. A radar system comprising a pulse transmitter; a receiver; a single antenna for both radiating and receiving pulse signals; a duplexer circuit interconnecting said transmitter, receiver and antenna for substantially preventing the transmitter pulses from reaching the receiver, said duplexer circuit including a switch having an ionizable gas; and circuit means connected to said switch and to said pulse transmitter and responsive to partial ionization of said gas for triggering said transmitter and thereby causing it to transmit a pulse.

12. In a radar system including a pulse transmitter and a duplexer containing an ionizable gas, a circuit for triggering said transmitter comprising, in combination, a pre-firing electrode in said tube containing an ionizable gas for applying a pre-firing pulse to said gas and thereby partially ionizing said gas; and circuit means connected to said tube and responsive to the partial ionization of said gas for applying a triggering pulse to said transmitter.

13. A radar system comprising a pulse transmitter; a receiver; a single antenna for both radiating and receiving pulse signals; a transmit-receive circuit interconnecting said transmitter, receiver and antenna, said circuit including an ignitron type discharge device having a mercury cathode, an ignitor electrode in contact with said cathode to which a pulse may be applied for striking a mercury arc, and an auxiliary anode close to said cathode normally maintained positive relative to said cathode for partially ionizing the gas between it and said cathode upon the striking of said mercury arc; and circuit means connected to said auxiliary anode and responsive to the partial ionization of the gas between it and said cathode for applying a triggering pulse to said transmitter.

14. A radar system as set forth in claim 13, including second means responsive to said partial ionization of said gas for applying a delayed deionization pulse to said ignitron type discharge device for deionizing the gas therein after the transmitter has transmitted a pulse.

15. A radio-frequency switch tube comprising a closed container; a mercury cathode electrode at one end of said container; an ignitor electrode in contact with said mercury electrode for producing a mercury arc when energized by a pre-firing pulse; a main anode electrode at the other end of said container and adapted to receive the center conductor of a coaxial transmission line; and a second cathode electrode located intermediate the anode electrode and mercury electrode, said second cathode electrode being formed with a central aperture, and radially extending beyond said closed container, the circumferential edge of said second cathode electrode being adapted to engage the outer conductor of said coaxial transmission line.

16. A vapor electric device comprising a sealed container, a portion of which functions as a rectangular waveguide; a main anode element comprising a portion of a broad wall of said rectangular waveguide; a cathode electrode located opposite said anode electrode and comprising a second portion of a broad wall of said rectangular waveguide; a pair of walls joining said cathode and anode electrodes and insulating them from one another, the cathode electrode, anode electrode and pair of walls defining between them a waveguiding space, said cathode electrode being formed with a central aperture; a mercury cathode electrode located beyond the first-named cathode electrode and insulated therefrom; and an ignitor electrode in contact with said mercury electrode for producing a mercury arc upon application thereto of a pre-firing pulse.

17. In combination, a coaxial transmission line having an open end; and a radio-frequency switch tube comprising a closed container; a mercury cathode electrode at one end of said container; an ignitor electrode in contact with said mercury electrode for producing a mercury arc when energized by a pre-firing pulse; a main anode electrode at the other end of said container and adapted to receive the center conductor of a coaxial transmission line; and an annular second cathode electrode located intermediate the anode electrode and mercury electrode, said second cathode electrode being formed with a central aperture, and radially extending beyond said closed container, the circumferential edge of said second cathode electrode being adapted to engage the outer conductor of said coaxial transmission line.

18. In combination, a coaxial transmission line having an open end and capable of propagating a high-power radio-frequency pulse; a radio frequency switch tube located at the end of said coaxial line comprising a sealed container; a mercury cathode electrode at one end of said container; an ignitor electrode in contact with said mercury electrode for producing a mercury arc when energized by a pre-firing pulse; a main anode electrode at the other end of said container and adapted to receive the end of the center conductor of said coaxial transmission line; and an annular second cathode electrode located intermediate the anode electrode and mercury electrode, said second cathode electrode being formed with a central aperture, and radially extending beyond said closed container, the circumferential edge of said second cathode electrode being adapted to engage the end of the outer conductor of said coaxial transmission line; an auxiliary anode electrode located close to said mercury electrode and normally maintained positive relative to said mercury electrode for ionizing the gas between it and said mercury electrode when said mercury arc is produced; and circuit means connected to said auxiliary anode electrode and responsive to the ionization of the gas between it and said mercury electrode for applying a high-power, radio-frequency pulse to said coaxial transmission line.

References Cited in the file of this patent

UNITED STATES PATENTS

| | | |
|---|---|---|
| 1,537,021 | Rentschler | May 5, 1925 |
| 2,523,789 | Teare | Sept. 26, 1950 |
| 2,651,737 | Marshall | Sept. 8, 1953 |
| 2,743,439 | Crump | Apr. 24, 1956 |
| 2,745,096 | Jensen | May 8, 1956 |
| 2,776,409 | Goldstein | Jan. 1, 1957 |
| 2,801,392 | Booth | July 30, 1957 |
| 2,970,283 | Griemsmann | Jan. 31, 1961 |